Aug. 6, 1968     M. W. WOLFE     3,396,072

CAMELBACK

Filed Jan. 29, 1964

*INVENTOR.*
MERRITT W. WOLFE

BY

*J. B. Holden*
ATTORNEY

United States Patent Office 3,396,072
Patented Aug. 6, 1968

3,396,072
CAMELBACK
Merritt W. Wolfe, Akron, Ohio, assignor to The Goodyear Tire & Rubber Company, Akron, Ohio, a corporation of Ohio
Continuation-in-part of application Ser. No. 132,130, Aug. 17, 1961. This application Jan. 29, 1964, Ser. No. 342,333
2 Claims. (Cl. 161—151)

ABSTRACT OF THE DISCLOSURE

Camelback is provided on its undersurface with a rubber ply containing discrete lengths of filamentary material. Such a ply gives good adhesion to the abraded and adhesive-covered carcass of an old tire to be retreaded.

---

This invention relates to camelback for retreading tires. This application is a continuation-in-part of my application Ser. No. 132,130 filed Aug. 17, 1961, now abandoned.

The camelback of this invention includes on its bottom surface a ply of rubber containing short lengths of filamentary material. This ply may or may not be covered with a thin layer of cushion rubber. It serves the function of a breaker strip, and it gives better adhesion to the abraded and adhesive-covered carcass of an old tire to be retreaded, than a ply of rubber reinforced with continuous filaments such as are used customarily in a breaker strip, preventing separation of the retread from the carcass in use.

Comparative tests were made to demonstrate that a ply containing short lengths of filamentary material forms a stronger bond than a ply reinforced with continuous lengths of the same filamentary material. A ply of a rubber stock was prepared by coating uncured rubber onto nylon cord fabric in which the cords were continuous and parallel to one another. Another ply was prepared by milling the nylon flock into the same uncured rubber stock so that each filamentary length was dispersed in the rubber separate from each other and orientated generally parallel to one another in the direction of milling.

Each of the plies was sandwiched between two pieces of uncured rubber compound and the laminates were cured for 40 and 80 minutes at 275° F. One-inch wide strips were cut from each of the cured laminates, those containing the nylon cord fabric being designated strips A, and those containing the nylon flock being designated strips B. The longitudinal edges of the respective strips were parallel to the direction of the respective reinforcements they contained. The strips were partially slit along the interfaces of the laminae, and were then subjected to a standard adhesion test known as ASTM static strip adhesion test D-413-39. The results of the adhesion tests conducted both at room temperature (RT) and 275° F., are recorded in the following table for the materials used, at 275° F. for both 40 and 80 minutes.

| Materials Tested | Pounds Adhesion | |
|---|---|---|
| | RT | 275° F. |
| Test Strips A: | | |
| 40 min./275° F. cure | 32 | 23 |
| 80 min./275° F. cure | 31 | 24 |
| Test Strips B: | | |
| 40 min./275° F. cure | 85 | 80 |
| 80 min./275 F. cure | 78 | 57 |

Test strips B which contained nylon flock gave two to three times as strong a bond as test strips A which contained nylon cords.

In preparing the camelback of this invention, the filamentary material used in reinforcing the rubber ply adhered to the bottom surface of the camelback is in short lengths about ¼ inch to 2 inches long. It may be short lengths of rayon or nylon filaments, flock or yarn, or cotton yarn or old tire cord composed of cord of different textiles or wire (preferably steel wire which is brass coated to form a strong bond with the rubber). These filamentary lengths are short compared to the width of the camelback. The preferred filamentary material is lengths of nylon filaments about ¾ inch long.

The filamentary material is aligned or orientated in one general direction within the rubber by milling or calendering or even by extruding. When the rubber containing filamentary material is elongated by any one or more of these processes, the filamentary material is at least partially aligned or orientated within the rubber in the direction in which it is elongated.

Sheets of curable rubber stock containing such lengths of orientated filamentary material acquire different properties due to the reinforcing elements. For instance, their tensile strengths in the direction of orientation are greater than in the opposite direction.

The following table illustrates the effect of the orientation of different nylon materials in a rubber stock. Tests A, B and C were made on rubber containing 5 percent by volume of ¾-inch long nylon, and tests D, E and F on rubber containing 5 percent by volume of flocked nylon. Tests A and D tested the reinforced ply in the direction in which the materials were orientated; tests B and E tested the plies perpendicularly to the direction of orientation; and tests C and F were made at an angle of 30 degrees to the direction of orientation. Test F gives approximate figures obtainable on a representative nylon fabric, for comparison. Tensile strengths in "pounds per square inch" are recorded as the result of testing each of the stocks while subjected to 10, 20 and 30 percent elongation, and the ultimate tensile strength (UT) on break is given. The ultimate elongation (UE) at the break is also given.

| | Elongation | | | | |
|---|---|---|---|---|---|
| | 30% | 20% | 10% | UT | UE |
| Shredded nylon: | | | | | |
| With grain | 850 | 600 | 350 | 1,300 | 80 |
| Across grain | 250 | 200 | 150 | 950 | 170 |
| 30° to grain | 250 | 200 | 150 | 1,025 | 170 |
| Flocked nylon: | | | | | |
| With grain | 1,500 | 1,150 | 550 | 1,675 | 200 |
| Across grain | 275 | 200 | 125 | 1,500 | 260 |
| 30° to grain | 350 | 250 | 150 | 1,675 | 260 |
| Representative fabric | 5,850 | 4,000 | 2,000 | 5,850 | 30 |

The filamentary material permits elongation far in excess of that obtainable with representative fabric. The highest tensile strengths are obtained in the direction of orientation of the filamentary material.

In general, 2 to 10 percent or perhaps 15 percent by volume of textile filamentary material will be used. Tensile strengths start to drop when the amount used exceeds about 7 percent. If wire is employed, about 2 percent by volume (12 percent by weight) will generally be preferred, the maximum being not over about 4 or 5 percent by volume or 20 percent to 25 percent by weight.

The reinforced ply is generally prepared by milling the filamentary material into the rubber and then calendering or extruding this stock. Alternatively, it may be added to the stock as it enters the calender or extruder.

When the reinforced ply is incorporated in camelback it may extend from one edge of the camelback to the other. It may be confined under the central portion of the camelback which is placed adjacent the outer cord ply of the tire in retreading. The reinforced ply extends over the crown of the tire, and ordinarily down over the shoulders, and may extend into the side walls. It will cover more or less of the bottom of the camelback as required to reinforce any carcass plies damaged in buffing or for any other cause. The ply containing the filamentary material may be applied to the camelback at the time of manufacture, but is preferably applied to the camelback by the retreader, as required.

In the reinforcing ply, the short lengths of filamentary material may be orientated circumferentially or in the bead-to-bead direction. They may even be orientated at an angle of 30 to 40 degrees to the centerline of the tire, in which case two such plies forming equal angles on opposite sides of the centerline will ordinarily be used.

The invention is further explained in connection with the accompanying drawings, in which—

Figure 1:
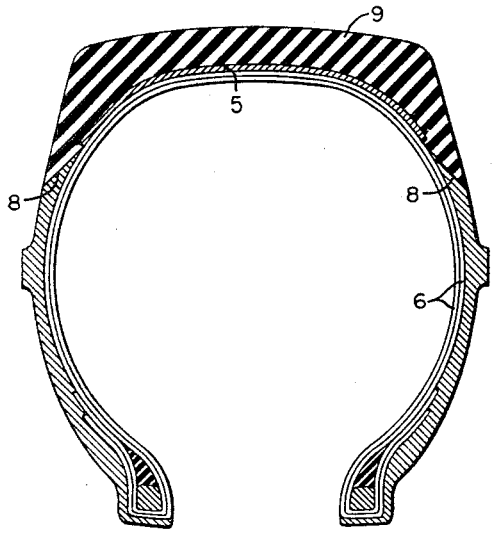
FIG. 1 is a radial section through an uncured retreaded tire of this invention.

FIGURE 1 illustrates a tire with a ply 5 containing orientated filamentary material (nylon being preferred) under the tread and adjacent the two cord plies 6. The cords in the plies 6 are each at an angle of 30 to 40 degrees to the centerline, on opposite sides of the centerline so that the individual cords in the respective plies cross one another. There is nothing novel about this cord construction. These cords are preferably of nylon, but rayon, polyester fibers, etc. can be used.

The tire of FIGURE 1 is an uncured retreaded tire. The dividing line between the ends of the camelback and the old rubber of the tire is indicated by the numeral 8 which is used to designate the under surface of the ends of the camelback 9 in FIGURE 3. In preparing the tire for the use of camelback, the old rubber is abraded away and the surface of the carcass which is exposed is treated with rubber cement or the like (not shown) as is customary in the industry, to provide a good bond between the camelback and the old rubber.

In preparing the tire, the outer cord ply is sometimes accidentally damaged by the abrading device. The adherence of rubber ply 5 containing filamentary material, directly to the outer cord ply, largely or entirely compensates for such damage. The damaged cord ply may be removed, down into the sidewall. If such damage is recognized, the reinforcing ply is advantageously one in which the filamentary material is orientated to best compensate for such damage. Orientation of the filamentary material in the rubber accomplishes several advantages, and the direction in which it is orientated may be the result of the consideration of a number of factors. For instance, if the filamentary material is orientated in a bead-to-bead direction it resists cracking of the grooves and channels in the surface of the retread, after curing. If the filamentary material is arranged circumferentially of the tire it resists growth of radial cracking in the sidewall surfaces, and if the filamentary material is arranged in a bead-to-bead direction it resists circumferential cracking of the sidewalls; consequently, it may be desired to arrange it on the bias to assist in both of these forms of cracking.

Certain capping (retreading) material is precured, and bears the desired retread design. The invention is applicable to the use of orientated filamentary material in such pre-cured tread material. It is buffed on its undersurface in the usual way, the old tread is buffed from the tire carcass in the usual way, the ply containing the filamentary material is then applied to the carcass or the undersurface of the retread with cement, and the retread is then applied to the tire with the filamentary material orientated in the direction in which it will be most effective. The tire is then subjected to curing in a hot room to cure the cement, usually at about 160 to 220° F.

The invention is applicable to various forms of top capping which include renewal of the shoulders and may include renewal of the sidewalls down to the scuff rib.

Although it is conceivable that the ply containing the filamentary material may not be extended around the whole tire, but may cover only parts thereof, a ply which encircles the tire and extends the same distance on each side of the center of the tread, uniformly around the tire is preferred so as to cause minimum unbalance of the tire.

Figure 3:
FIG. 3 is a section through the improved camelback.

FIGURE 3 shows camelback with a ply 5 containing filamentary material across the central portion of its bottom. It may cover the whole bottom. When the camelback is incorporated in the tire, the ply 5 reinforces the old carcass even where it is not damaged by the abrader.

Figure 2:
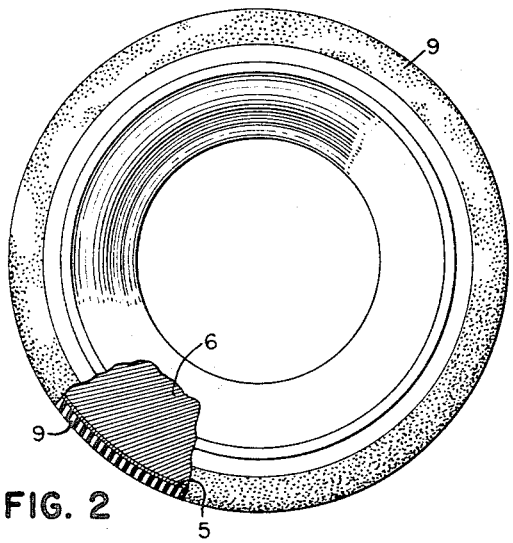
FIG. 2 is a side view of a cured new or retreaded tire, partly broken away.

FIGURE 2 shows a finished tire which may be either a new tire or a retreaded tire. It includes the reinforcing ply 5 which extends over the crown of the tire and over the shoulders, down to the sidewalls.

Figure 4:
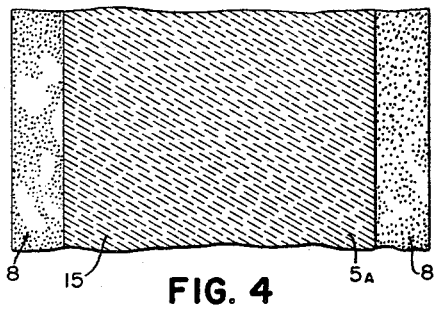
FIG. 4 is a view of the bottom of camelback with the filamentary material orientated at an angle.
Figure 5:
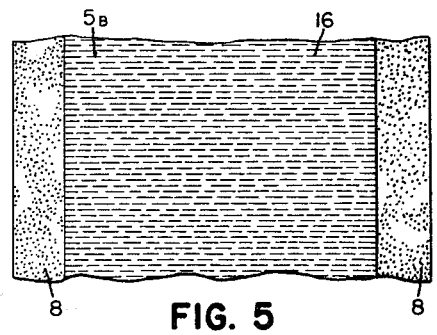
FIG. 5 is a view of the bottom of camelback with the filamentary material orientated directly from bead to bead.
Figure 6:
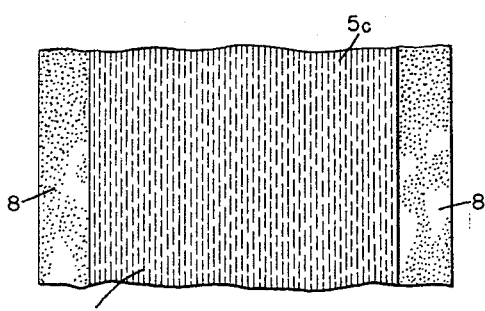
FIG. 6 is a view of the bottom of camelback with the filamentary material orientated longitudinally in the bottom thereof.

FIGURES 4 to 6 illustrate reinforcements in the bottom of camelback, using filamentary material orientated at different angles. Different filamentary materials can be used.

In the reinforcing ply 5–a of the camelback of FIGURE 4, the filamentary material 15 is orientated at an angle of 30 to 40 degrees to the edge of the camelback. This is advantageously used to reinforce a damaged ply of the carcass in which the cords are orientated in the same direction as the filamentary material 15.

In FIGURE 5 the filamentary material 16 in the ply 5–b is orientated in a bead-to-bead direction. Such camelback can be used to advantage where a radial ply of the carcass has been damaged, and to provide resistance to groove or channel cracking.

In FIGURE 6 the filamentary material 17 in the ply 5–c is orientated longitudinally of the camelback. This structure may be used to simulate a banded or belted tire structure common with radial-ply wire carcasses.

In each of the different types of reinforcements shown in FIGURES 4, 5 and 6, flock nylon, about ¾-inch long, in an amount equal to about 5 percent by volume of the rubber employed, will give good results.

The reinforcing ply may vary in thickness. It may be of uniform composition throughout, or the filamentary material may be concentrated toward the center (as by sandwiching a ply containing orientated filamentary material between two plies containing no filamentary material), or the filamentary material may be concentrated at one surface of the reinforcing ply (as by laminating a ply containing no filamentary material to one surface of a ply containing filamentary material).

There is nothing novel in the construction of the tire or the method of building or curing it, except for the presence of the reinforcing ply which contains filamentary material. Any retreading equipment may be used, and the retreading process is any usual process except for the inclusion of the reinforcing ply containing short lengths of filamentary material. The camelback can be restricted in width to cover only the tread, or it can cover the shoulders and extend down into the sidewalls. The reinforcing ply can be as wide as the camelback, but may be narrower. It can be built into the tire separately by applying it to the carcass before applying the camelback. In that event, it will be utilized in the same manner as a rubber ply.

The term "retreading" is used herein in its most general sense to refer to renewing merely the crown of the tread, or renewing the shoulders also, more particularly called top capping. It is also used to include renewing the tread and the adjoining portion of the tire down to the scuff rib in the sidewall area.

The invention is covered in the claims which follow.

What I claim is:

1. Camelback which is shaped to replace the worn tread and shoulders of a tire which camelback is of tread rubber composition and has adhered to the bottom thereof a rubber ply containing discrete lengths of filamentary material which are relatively short compared to the width of the camelback and at least a substantial portion of which are parallel to one another.

2. The camelback of claim 1 in which the filamentary material in the adhered ply constitutes 2 to 15 percent by volume of the ply, and the pieces of this filamentary material each measure substantially ¼ to 2 inches in length.

References Cited

UNITED STATES PATENTS

| | | |
|---|---|---|
| 1,488,343 | 3/1924 | Hoffman. |
| 1,526,984 | 2/1925 | Hopkinson 156—110 |
| 2,411,659 | 11/1946 | Manning 156—128 X |
| 3,149,658 | 9/1964 | Wolfe 156 — 95 X |
| 3,225,812 | 12/1965 | Barrett 156—128 X |
| 3,136,673 | 6/1964 | Carver 156—96 |

FOREIGN PATENTS 195,741   1/1920   Canada.

EARL M. BERGERT, *Primary Examiner.*

CLIFTON B. COSBY, *Assistant Examiner.*